United States Patent [19]
Bonicel

[11] Patent Number: 5,619,606
[45] Date of Patent: Apr. 8, 1997

[54] METHOD OF MANUFACTURING A REINFORCED CABLE CONTAINING OPTICAL FIBERS APPARATUS FOR IMPLEMENTING THE METHOD AND A CABLE OBTAINED BY PERFORMING THE METHOD

[75] Inventor: Jean-Pierre Bonicel, Rueil Malmaison, France

[73] Assignee: Alcatel Cable, Clichy Cedex, France

[21] Appl. No.: 510,489

[22] Filed: Aug. 2, 1995

[30] Foreign Application Priority Data

Aug. 10, 1994 [FR] France ................... 94 09902

[51] Int. Cl.$^6$ ...................... G02B 6/44
[52] U.S. Cl. ........................ 385/102
[58] Field of Search .................. 385/100–105, 385/110–113, 147

[56] References Cited

U.S. PATENT DOCUMENTS

| | | | |
|---|---|---|---|
| 4,221,854 | 9/1980 | Hammar et al. | 429/234 |
| 4,740,538 | 4/1988 | Sekutowski | 523/205 |
| 4,770,489 | 9/1988 | Saito et al. | 385/113 |
| 5,051,308 | 9/1991 | Reed et al. | 428/412 |
| 5,413,657 | 5/1995 | Yamanashi et al. | 156/235 |

FOREIGN PATENT DOCUMENTS

| | | |
|---|---|---|
| 0113377A1 | 7/1984 | European Pat. Off. . |
| 0261675A2 | 3/1988 | European Pat. Off. . |
| 0492206A1 | 7/1992 | European Pat. Off. . |
| 2525349 | 10/1983 | France . |
| 661800A5 | 8/1987 | Switzerland . |
| 2169095A | 7/1986 | United Kingdom . |

*Primary Examiner*—Akm E. Ullah
*Attorney, Agent, or Firm*—Sughrue, Mion, Zinn, Macpeak & Seas

[57] ABSTRACT

The present invention relates to a method of manufacturing a cable containing optical fibers, the cable including an optical core assembly surrounded by a plurality of mechanical reinforcing members made of a plastics material reinforced with reinforcing fibers, referred to as an "FRP" material, the reinforcing members being disposed helically around said core assembly so as to form a reinforcing tube, said reinforcing members having a thermal expansion coefficient that is lower than those of the remaining portions of said cable and a Young's modulus that is higher than those of the remaining portions of said cable other than said optical fibers. The method includes the following steps: simultaneously manufacturing said reinforcing members on their own and by coating said reinforcing fibers with the plastics material, without the material being polymerized; winding said reinforcing members around said optical core assembly, while interposing a separator made of a plastics material having low adhesion to said FRP material between each of said reinforcing members, so as to separate them; and polymerizing said plastics material.

20 Claims, 2 Drawing Sheets

METHOD OF MANUFACTURING A REINFORCED CABLE CONTAINING OPTICAL FIBERS APPARATUS FOR IMPLEMENTING THE METHOD AND A CABLE OBTAINED BY PERFORMING THE METHOD The present invention relates to a method of manufacturing a reinforced cable containing optical fibers, apparatus for implementing the method, and a cable obtained by performing the method.

BACKGROUND OF THE INVENTION

There are several currently known types of optical fiber cable structure: in particular there are optical fiber cables in which the optical fibers are left loose or disposed in ribbons inside a central tube, or optical fiber cables in which the optical fibers are disposed in the helical grooves of a central grooved rod. Other structures exist which are not described in detail herein, but to which the present invention may also be applied.

In all optical fiber cable structures, it is necessary to provide mechanical reinforcing members so as to avoid subjecting the optical fibers to large forces, in particular traction and bending forces on installing the cable in a duct or when the cable is suspended, which is becoming increasingly common for optical fiber cables. Mechanical reinforcing members also serve to take up the effects of variations in the lengths of the various elements of the cable other than the optical fibers (the central strength member, e.g. in the form of a tube or a grooved rod, and the protective jackets) when the cable is subjected to large temperature variations. Therefore, the reinforcing members must have a thermal expansion coefficient that is lower than those of the remaining portions of the cable, and a Young's modulus that is higher than those of the remaining portions of the cable (other than the optical fibers which, in particular, have a thermal expansion coefficient that is much lower than those of the other elements of the cable).

The reinforcing members may be metallic or dielectric. Reinforcing members that are non-metallic, i.e. that are not electrically conductive, are preferred so as to avoid the risks of damage due to lightning, and the problems of induced voltages. Therefore, currently used reinforcing members are dielectric, i.e. made of non-conductive materials.

Plastics materials that are reinforced with reinforcing fibers are particularly suitable for such reinforcing members. Such materials are commonly referred to as "Fiber-Reinforced Plastics" (FRP) and they comprise reinforcing fibers, e.g. fibers made of aramid, e.g sold under the Kevlar trademark, of polyester, or of glass, embedded in a resin, e.g. such as an epoxy resin or a polyester resin. The properties of these materials make them particularly suitable for mechanically reinforcing optical fiber cables.

Optical fiber cables using FRP reinforcing members are made using two different methods.

In a first method, the result of which is shown in FIG. 3B of U.S. Pat. No. 4,770,489, for example, which figure shows an optical core assembly, e.g. constituted by a tube containing loose optical fibers, surrounded by a plurality of reinforcing members made of an FRP material, each of the reinforcing members is manufactured on its own from reinforcing fiber strands coated with resin, and the members are then twisted onto the optical core assembly, i.e. they are assembled helically therearound, during a distinct subsequent twisting step. The structure of the resulting cable is advantageous because it makes the cable relatively flexible, and imparts the desired mechanical strength properties to it.

Unfortunately, making that type of structure poses certain problems.

Firstly, making the reinforcing members on their own is expensive.

Furthermore,, in addition to the step of manufacturing the reinforcing members entirely, a subsequent twisting step is required, and this makes manufacturing the cable lengthy and complex, and therefore expensive.

In a second method, the result of which is shown in FIG. 2A of U.S. Pat. No. 4,770,489, the above-mentioned problems can be solved. A tube is made of an FRP material around the optical core assembly, e.g. by means of an operation referred to as "pultrusion" (as opposed to "extrusion"), which consists, on a production line, in bringing reinforcing fiber strands to the vicinity of the optical core assembly, and then in causing the resulting assembly to advance by pulling it successively through a resin-coating bath, a calibration die for imparting the desired cross-section to the cable, and finally apparatus for polymerizing the resin.

The pultrusion method enabling an FRP tube to be made around an arbitrary element is described in detail in Patent Application EP-0 284 667 (in that document, the tube is made directly around an optical fiber).

The second method is advantageous because it is less expensive to implement than the above-described first method. The reinforcing member is manufactured in a single step directly around the optical core assembly. Furthermore, the resulting structure exhibits the desired mechanical characteristics.

Unfortunately, that structure is very rigid, so that installing it in underground ducts or suspending it from pylons poses problems.

OBJECTS AND SUMMARY OF THE INVENTION

An object of the present invention is to provide a method of manufacturing an optical fiber cable reinforced by means of reinforcing members made of an FRP material, which method is cheap to implement and enables a cable to be made that is flexible; and that exhibits the required mechanical characteristics.

To these ends, the present invention provides a method of manufacturing a reinforced cable containing optical fibers, the cable including an optical core assembly containing at least one optical fiber installed in a strength member, said optical core assembly being surrounded by a plurality of mechanical reinforcing members made of a plastics material reinforced with reinforcing fibers, referred to as an "FRP" (Fiber-Reinforced Plastics) material, the reinforcing members being disposed helically around said core assembly so as to form a reinforcing tube therearound, said reinforcing members having a thermal expansion coefficient that is lower than those of the remaining portions of said cable and a Young's modulus that is higher than those of the remaining portions of said cable other than said optical fibers, said method including the following steps:

simultaneously manufacturing said reinforcing members on their own and by coating said reinforcing fibers with the plastics material in which they are to be embedded, without the material being polymerized;

winding said reinforcing members around said optical core assembly, while interposing a separator made of a plastics material having low adhesion to said FRP material between each of said reinforcing members, so as to separate each of said reinforcing members from the adjacent reinforcing members by means of said separators which are disposed such that two adjacent reinforcing members are not in contact with each other and they are separated from each other by at least a portion of one of said separators; and polymerizing said plastics material.

The method of the invention associates the advantages of the two prior art manufacturing methods, i.e. low manufacturing cost, and the possibility of obtaining a flexible cable, without suffering from the drawbacks thereof.

By using separators made of a material that is chosen to adhere weakly to the reinforcing members, it is possible to make each of the members on its own but simultaneously and directly around the optical core assembly in a single pultrusion step. In this way, the separators make it possible to decouple the reinforcing members from one another during pultrusion, so as to avoid obtaining a solid tube, as in the second prior art method, thereby making the cable flexible, and cheap to manufacture.

The present invention further provides apparatus for implementing the method of the invention, as indicated in the claims.

Compared with conventional pultrusion apparatus, the apparatus of the invention includes separator-supply means, it has, for example, rotary transmission and reception means so as to, impart a helical structure in the cable to the reinforcing fibers and to the reinforcing members that contain them (other known equivalent means may be used for this purpose), and it is such that it enables the reinforcing members to be polymerized once they have been deposited on the optical core assembly so as to be interposed with the separators.

Finally, the present invention provides a reinforced cable containing optical fibers, the cable including an optical core assembly containing at least one optical fiber installed in a strength member, said optical core assembly being surrounded by a plurality of mechanical reinforcing members made of a plastics material reinforced with reinforcing fibers, referred to as an "FRP" material, the reinforcing members being disposed helically around said core assembly so as to form a reinforcing tube therearound, said reinforcing members having a thermal expansion coefficient that is lower than those of the remaining portions of said cable and a Young's modulus that is higher than those of the remaining portions of said cable other than said optical fibers, wherein each of said reinforcing members is separated from the adjacent reinforcing members by means of a separator made of a plastics material that has low adhesion to said FRP material, said separators being disposed such that two adjacent reinforcing members are not in contact with each other and they are separated from each other by at least a portion of one of said separators.

Advantageously, so that they do not adhere to the material forming the reinforcing members, the separators may be made of a fluorine-containing resin or of a polyester resin.

So that their properties are not degraded during the polymerization step, the separators may be made of a material which retains its low-adhesion properties when it is subjected to high temperatures.

The reinforcing members may be disposed directly on said optical core assembly, or on a jacket deposited thereon.

In a possible embodiment of the invention, the separators may be constituted by thin tapes of width at least equal to the thickness of the reinforcing tube.

In another possibles embodiment of the invention, the separators may be constituted by the ribs in an "outer" grooved rod surrounding the optical core assembly, the reinforcing members being inserted in the grooves in the rod.

BRIEF DESCRIPTION OF THE DRAWINGS

Other characteristics and advantages of the present invention appear from the following description of several embodiments of a cable of the invention, and of a method and apparatus for manufacturing such a table, given by way of non-limiting example and with reference to the accompanying drawings, in which.

In the figures, common elements are given the same references.

MORE DETAILED DESCRIPTION

Figure 1:
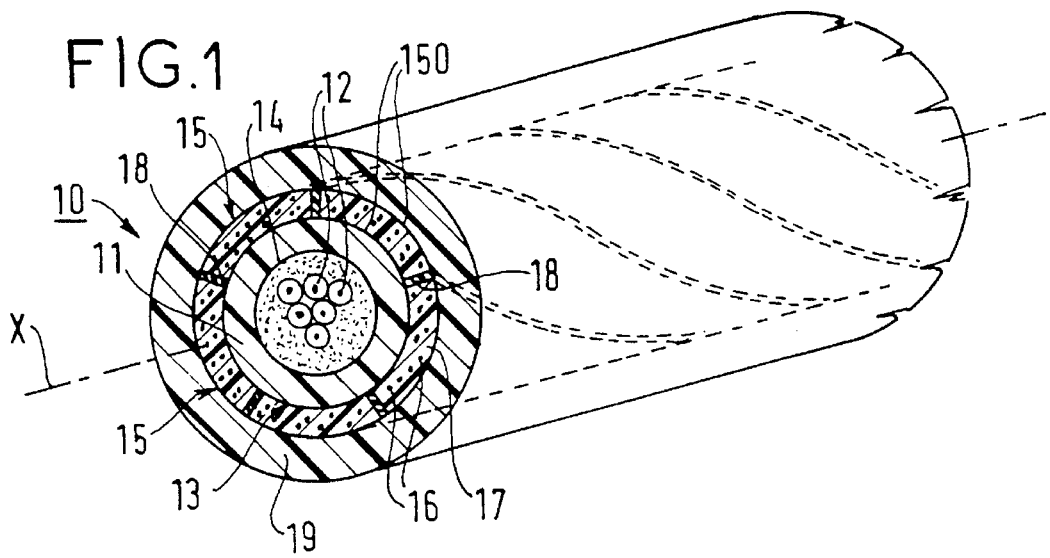
FIG. 1 is a perspective view of a first embodiment of an optical fiber cable of the invention.

FIG. 1 shows a first embodiment of an optical fiber cable 10 of the present invention. The cable 10 includes a central tube 11, e.g. made of nylon, of polyester, of polypropylene, or of any other suitable material. The tube contains a plurality of optical fibers 12 covered with their respective resin coverings (not referenced). The assembly comprising the tube 11 and the optical fibers 12 that it contains is referred to as the "core assembly" and it is referenced 13. Optionally, the tube 11 may be filled with a filler gel or with a material 14 that swells on contact with water, serving in particular to protect the fibers 12 against ingress of moisture.

The optical core assembly 13 is surrounded directly by a plurality of reinforcing members 15 made of an FRP (Fiber-Reinforced Plastics) material. More precisely, each of the reinforcing members is made up of reinforcing fiber strands 16 such as fibers made of aramid (e.g. sold under the Kevlar trademark), of polyester, of glass, of carbon, or of other materials, embedded in a resin 17 of the epoxy resin or polyester resin type, so that the thermal expansion coefficient of the reinforcing members 15 is lower than those of the remaining portions of the cable, and the Young's modulus of the reinforcing members 15 is higher than those of the remaining portions of the cable 10, other than the optical fibers. The reinforcing members 15 are disposed helically at a constant pitch or at an alternating pitch (i.e. SZ), around the optical core assembly 13.

The reinforcing fibers 16 may themselves be disposed helically inside the reinforcing members 15.

In accordance with the invention, the reinforcing members 15 are separated from one another by thin tapes 18 made of a material adhering weakly to the resin 17; for example, the tapes 18 may be made of a fluorine-containing resin, or a polyester resin, depending on the resin 17 of the reinforcing members 15.

In the embodiment shown in FIG. 1, the tapes 18 constitute separators disposed radially relative to the axis X of the cable 10.

As explained above, by using tapes 18, it is possible for the reinforcing members 15 to be decoupled mechanically from one another, so as to obtain a structure of the type of that obtained with the above-described first prior art method, so that the cable 10 is very flexible. The separator tapes 18 also enable a plurality of reinforcing members 15 (and not a single rigid reinforcing tube, as in the above-described second prior art method) to be made simultaneously and on their own by pultrusion, and to be wound directly around the optical core assembly 13 while they are being manufactured, and prior to polymerizing the resin 17, so as to obtain a relatively low manufacturing cost.

The cable 10 is provided with a protective outer jacket 19 disposed around the reinforcing members 15. The jacket may be made of any type of extrudable material (polyolefins, compounds, fluorine-containing resins, etc.), and in particular materials that retain their properties even in the presence of high electric fields, in particular when the cable of the invention is to be suspended in the vicinity of high voltage or very high voltage power lines. It should be noted that, since the outside surface state of the reinforcing members 15 is not smooth, they adhere well to the jacket 19.

As shown in FIG. 1, the reinforcing members 15 are substantially trapezium-shaped in cross-section, with their long sides 150 being curved so as to match the curvature of the optical core assembly 13. This guarantees the compactness of the cable 10.

Figure 2:
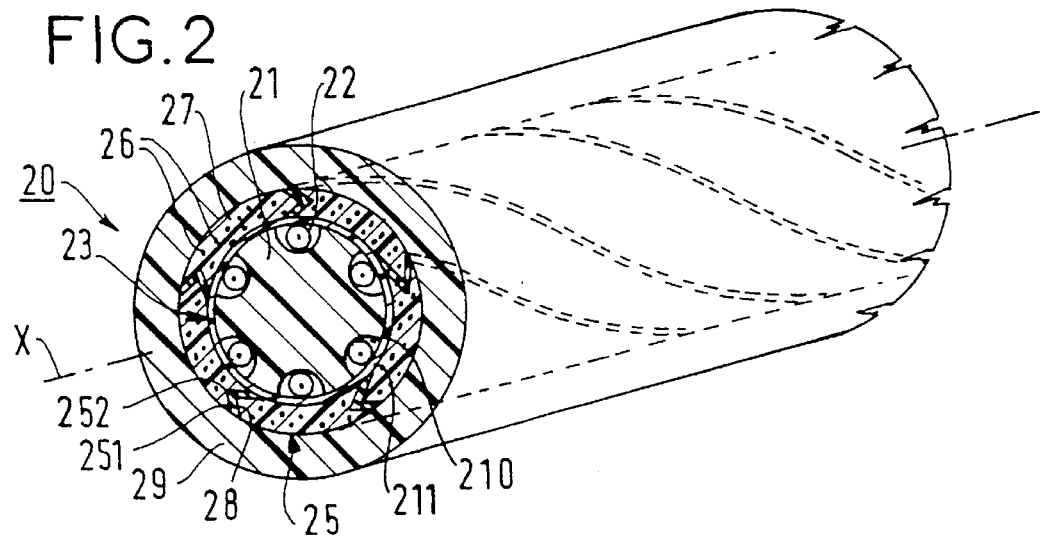
FIG. 2 is a perspective view of a second embodiment of an optical fiber cable of the invention.

FIG. 2 shows a second embodiment of a cable 20 of the invention.

The optical core assembly 23 of cable 20 differs from the optical core assembly of cable 10 in that it is of the type having a grooved rod 21. The grooved rod 21, e.g. made of a material of the same type as those indicated for the tube 11, is provided with a plurality of grooves 210, each of which is designed to receive one or more covered optical fibers 22. A polyester or paper tape 211 may be wound around the grooved rod 21 so as to retain the optical fibers 22 together with any filler gel (not shown) contained in the grooves 210.

A plurality of reinforcing members 25 made of an FRP material are disposed around the optical core assembly 23, each of which members is made up of reinforcing fiber strands 26 embedded in a resin 27. The only difference between reinforcing members 25 and the reinforcing members 15 shown in FIG. 1 lies in their cross-section: in FIG. 2, the cross-section of reinforcing members 25 is such that their short sides 251 and the separator tapes 28 (made of a material having the same properties as those described for tapes 18) are not substantially rectilinear, but rather each of them has a double-bevel shaped cross-section forming a point 252 so that the reinforcing members 25 interfit. An advantage of this is that the resistance of cable 20 to crushing is improved compared with cable 10, i.e. the contact between the reinforcing members 25 is improved by increasing the contact surface therebetween, so that all of the reinforcing members 25 are held in place even when the cable 20 is subjected to large radial forces.

A protective outer jacket 29, of the same type as the jacket 19 of cable 10 is disposed around the reinforcing members 25.

The reinforcing members 25 and the tapes 28 offer the same advantages as those indicated with respect to the reinforcing members 15 and the tapes 18 shown in FIG. 1.

Figure 3:
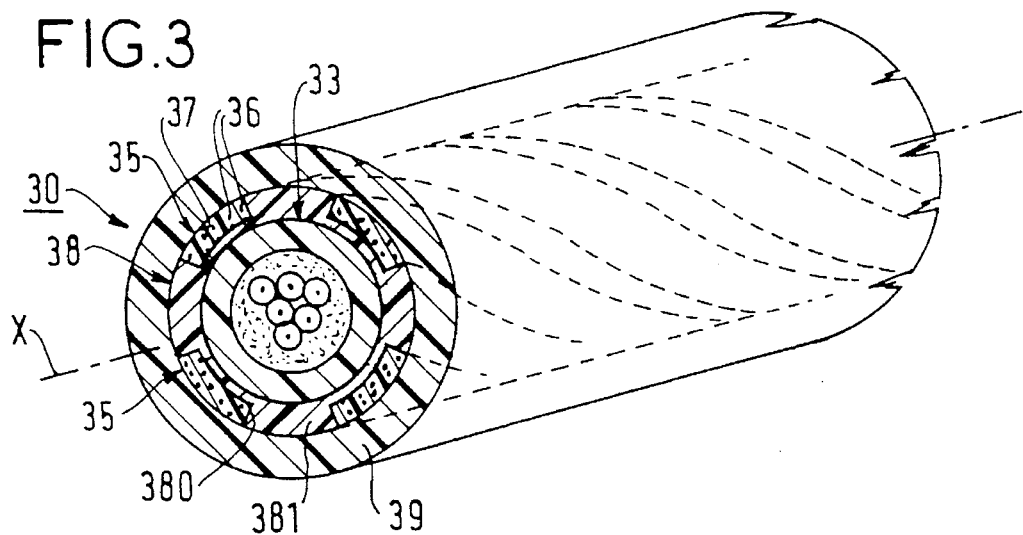
FIG. 3 is a perspective view of a third embodiment of an optical fiber cable of the invention.

FIG. 3 shows a third embodiment of a cable 30 of the invention. In cable 30, the optical core assembly 33 is identical to the optical core assembly 13 of the cable 10 shown in FIG. 1. A grooved rod 38 provided with ribs 380 and grooves 381 is extruded around the optical core assembly 33. Reinforcing members 35 that are substantially trapezium-shaped in cross-section and that are similar to reinforcing members 15 are disposed in the grooves 381 so that they occupy substantially all of the space defined by the grooves 381. The ribs 380 on the grooved rod 38 act as separators. To this end, the grooved rod 38 is made of a material that adheres weakly to the resin 37 coating the reinforcing fibers 36 of the reinforcing members 35.

A protective outer jacket 39 of the same type as the jacket 19 of cable 10 is disposed around the grooved rod 38.

The reinforcing members 35 and the ribs 381 offer the same advantages as those indicated with respect both to the reinforcing members 15 and tapes 18 shown in FIG. 1, and also to the reinsforcing members 25 and tapes 28 shown in FIG. 2.

By way of example, it is indicated that, in all of the above-described embodiments, the diameter of the optical core assembly 13, 23 or 33, may be in the range 3 mm to 10 mm for self-supporting cables (i.e. cables designed to be suspended from pylons), the thickness of the reinforcing members 15, 25, or 35 may be in the range 1 mm to 5 mm depending on the desired traction strength, the width of the tapes 18 may be substantially equal to the radial thickness of the reinforcing members 15, and the thickness of the tapes 18 or 28 may be in the approximate range 10 μm to 50 μm.

By way of example, the Young's modulus of the reinforcing fibers 16 is 5,000 daN/mm$^2$ when the reinforcing fibers are glass fibers, and it is in the range 6,500 daN/mm$^2$ to 7,000 daN/mm$^2$ when they are aramid fibers.

Apparatus 100 and a method of the invention for manufacturing the cable 10 shown in FIG. 1 are described below with reference to FIG. 4.

In accordance with the invention, the cable 10 is manufactured continuously with respect to making the reinforcing members 15 and to twisting them onto the optical core assembly 13.

The apparatus 100 includes a reel 101 for paying out the optical core assembly 13 along an "advance" axis Y. The reel 101 is therefore mounted to rotate about its axis x which is orthogonal to the plane of FIG. 4. The reel is further mounted on a support 102 that is mounted to rotate about axis Y.

Figure 4:
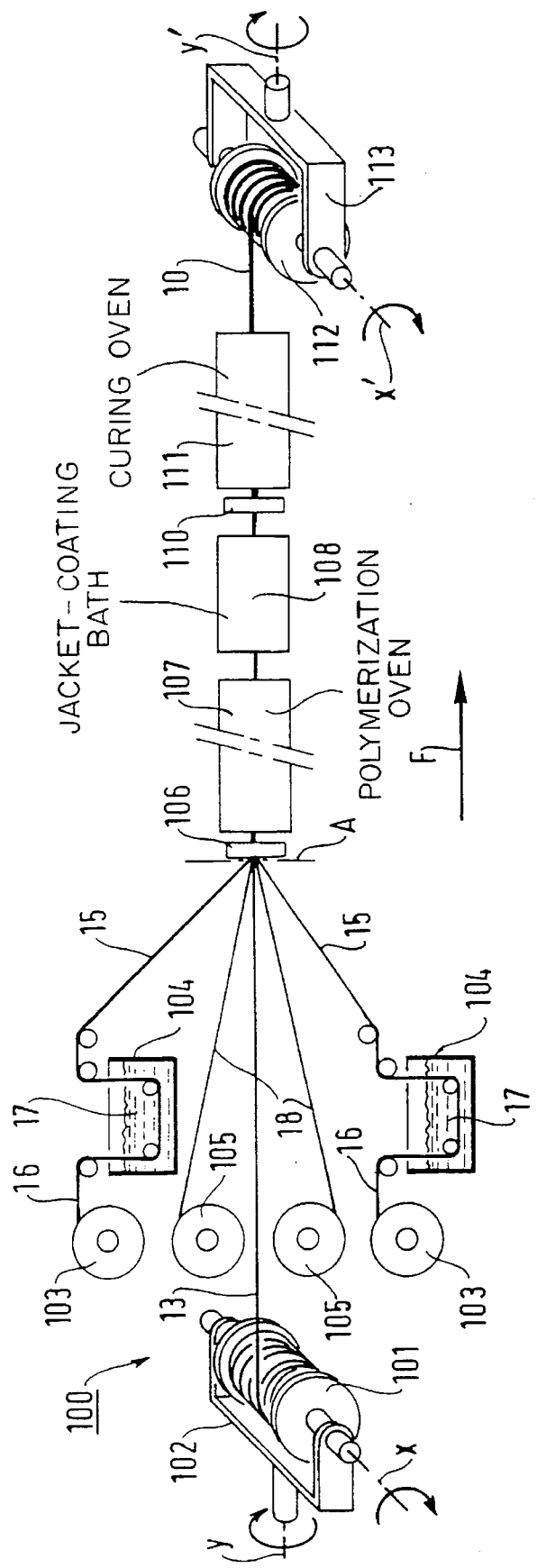
FIG. 4 is a diagrammatic view of apparatus of the invention.

Downstream from the reel 101 relative to the advance direction (represented by arrow F) in which the optical core assembly 13 advances through the apparatus 100, there are a plurality of reinforcing-fiber supply reels 103 (only two such reels are shown in FIG. 4 for reasons of clarity) for supplying reinforcing fiber strands 16 so as to bring said fiber strands 16 to the vicinity of the optical core assembly 13 at a section A of the apparatus 100.

Between reels 103 and the section A, there are a plurality of coating baths 104 (one bath per supply line for supplying the fiber strands 16), containing the non-polymerized resin 17, for coating the fiber strands 16 with the resin 17 before said strands reach the section A.

Upstream from the section A relative to the advance direction represented by arrow F, the apparatus 100 further includes a plurality of tape supply rolls for supplying the tapes 18 (in practice, as many rolls 105 as there are reinforcing members 15 because one tape 18 is required between two reinforcing members 15). The rolls 105 are disposed relative to reels 103 such that the tapes 18 can be wound in alternation with the reinforcing members 15 around the core assembly 13, so as to be interposed between the reinforcing members 15.

At the section A, because reel 101 rotates about axis Y, as does the reel 112 for winding the finished cable 10 (see below), the reinforcing members 15 (whose resin is not yet polymerized) and the tapes 18 are wound helically around the optical core assembly 13 so that, by the rolls 105 being disposed suitably relative to reels 103, a tape 18 is always to be found between two reinforcing members 15.

Downstream from the section A, the resulting assembly then passes through a calibration die 106 serving to impart the desired cross-section, for example but not necessarily a circular cross-section, to it, and it then passes through a polymerization oven 107 for polymerizing the resin 17.

Given the temperatures required to polymerize the resin 17 (generally about 150° C.), it is important to choose the material of the tape 18 to withstand such temperatures.

After the resin has been polymerized, the jacket 19 is made by causing the assembly comprising the optical core assembly 13 and the reinforcing members 15 to pass through a bath 108 containing the material that is to form the jacket 19, then through a die 110 for imparting the desired cross-section to the jacket, and finally through a curing oven 111 for polymerizing the jacket-forming material. It is also possible to make the jacket 19 by extrusion.

At the end of the line, there is a reel 112 for winding the finished cable 10, which reel is mounted to rotate about its axis x' (parallel to the axis of reel 101), and is mounted on a support 113 that is mounted to rotate about axis Y in phase with the support 102 of reel 101.

Without any difficulty and by means of routine operations, a person skilled in the art can adapt the above-described apparatus to manufacturing any type of cable of the invention.

For example, in order to manufacture the cable 20 shown in FIG. 2, i.e. in order to impart the specific cross-section to the reinforcing members, it is possible to use hot-shaping dies to make the separators 28 prior to manufacturing the cable 20, or in tandem therewith, by choosing the material of the separators 28 such that it is thermoformable.

In order to manufacture cable the 30 shown in FIG. 3, the grooved rod 38 may be made, e.g. by extrusion, prior to manufacturing the cable, and during manufacture of the optical core assembly 33, so that the optical core assembly is paid out into the apparatus 100 after it has been provided with the rod 38. In which case, the non-polymerized reinforcing members 35 are inserted into the grooves 381 prior to being polymerized, and the resulting assembly is then subjected to calibration followed by polymerization.

It is also possible to make the grooved rod 38 in the apparatus 100, upstream from where the nonpolymerized reinforcing members 35 are deposited in said grooved rod.

Generally, in order to manufacture a cable of the invention, the reinforcing members are manufactured partially before they are wound around the optical core assembly, i.e. the reinforcing fibers are coated with the plastics material in which they are to be embedded, and polymerization is performed only after they have been twisted onto the optical core assembly. This makes it possible for the reinforcing members to be manufactured and twisted onto the optical core assembly continuously. Since the reinforcing members are not polymerized at the time at which they are twisted onto the core assembly, the separators interposed between the reinforcing members and whose material is such that said separators adhere poorly thereto make it possible to maintain the reinforcing members decoupled from one another so as to obtain the desired flexibility (as in the above-described first prior art method), even after polymerization has been performed once the reinforcing members have been twisted onto the core assembly.

Naturally, the present invention is not limited to the above-described embodiments.

Firstly, in the embodiments described with reference to FIGS. 1 and 2, the separators 18 or 28 in the form of tapes may be much wider than the reinforcing members 15 or 25, e.g. so that they surround said reinforcing members entirely or partially, provided that any two adjacent reinforcing members are not in contact with each other, but rather they are separated from each other by a separator.

In which case, in order to manufacture a cable of the invention, tapes are chosen to be of width suitable for surrounding the reinforcing members 15 or 25 entirely or partially, and specific dies are disposed on the production line, which dies enable the reinforcing members 15 or 25 to be enclosed entirely or partially by the tapes 18 or 28. Such dies are well known in cable-making.

Furthermore, in a cable of the invention, any type of optical core assembly may be associated with any type of separator, and more generally, the structures of those elements of a cable of the invention other than the reinforcing members and the separators may take any known form.

Moreover, the reinforcing members may be disposed immediately on the optical core assembly, or else on an intermediate jacket itself deposited directly on the optical core assembly.

The reinforcing members may be assembled together around the core assembly at a pitch that varies or that is constant, and optionally that is alternating. Their cross-sections are not limited to the examples given in FIGS. 1 to 3, and they may be of arbitrary cross-section.

The materials used for the various elements of the cable of the invention are conventional materials, chosen so that their characteristics are adapted to their use in an optical fiber cable. The examples given are therefore not limiting.

The numerical values given are also given by way of example only.

A cable of the invention may be suspended, or buried underground directly, or in a duct. In addition to the reinforcing members 15, 25, or 35, it may contain other reinforcing members disposed inside the optical core assembly, e.g. with the fibers in the central tube, or else in the form of a central strength member in the grooved rod.

Generally, a cable of the invention may be used in any type of application for optical fiber cables, in particular in terrestrial or under-sea applications.

Finally, any means may be replaced with equivalent means without going beyond the ambit of the invention.

I claim:

1. A method of manufacturing a reinforced cable containing optical fibers, the cable including an optical core assembly containing at least one optical fiber installed in a strength member, said optical core assembly being surrounded by a plurality of mechanical reinforcing members made of a plastics material reinforced with reinforcing fibers, referred to as an "FRP" material, the reinforcing members being disposed helically around said core assembly so as to form a reinforcing tube therearound, said reinforcing members having a thermal expansion coefficient that is lower than those of the remaining portions of said cable and a Young's modulus that is higher than those of the remaining portions of said cable other than said optical fibers, said method including the following steps:

simultaneously manufacturing said reinforcing members on their own and by coating said reinforcing fibers with the plastics material in which they are to be embedded, without the material being polymerized;

winding said reinforcing members around said optical core assembly, while interposing a separator made of a plastics material having low adhesion to said FRP material between each of said reinforcing members, so as to separate each of said reinforcing members from the adjacent reinforcing members by means of said separators which are disposed such that two adjacent reinforcing members are not in contact with each other and they are separated from each other by at least a portion of one of said separators; and polymerizing said plastics material.

2. Apparatus for implementing the method according to claim 1, said apparatus including:

paying-out means for paying out said optical core assembly along an axis referred to as the "advance axis";

reinforcing-fiber supply means for supplying reinforcing fiber strands so as to bring said strands to the vicinity of said optical core assembly;

coating means for coating said reinforcing fibers with the plastics material in which they are to be embedded, said coating means being disposed between said reinforcing-fiber supply means and said advance axis, so that said reinforcing fiber strands arrive at said core assembly after they have been coated with said plastics material;

separator supply means for bringing said separators to the vicinity of said optical core assembly;

winding means for winding said reinforcing members and said separators around said optical core assembly;

said supply means being disposed so that said reinforcing members are wound around said core assembly while being interposed between said separators;

a calibration die, disposed downstream from the section of the apparatus where separators and coated fiber strands are wound around said core assembly, for imparting the desired cross-section to the resulting reinforcing tube;

polymerization means for polymerizing said plastics material of the reinforcing members; and means for winding the finished cable.

3. Apparatus according to claim 2, wherein, when said separators are of width greater than the thickness of said reinforcing tube, it further includes means for surrounding each of said reinforcing members, partially or entirely, with said separators.

4. Apparatus for implementing the method according to claim 1, including:

paying-out means for paying out said optical core assembly along an axis referred to as the "advance axis";

means for manufacturing an "outer" grooved rod around said optical core assembly, said separators being constituted by the ribs in said outer grooved rod;

reinforcing-fiber supply means for supplying reinforcing fiber strands so as to bring said strands to the vicinity of said optical core assembly;

coating means for coating said reinforcing fibers with the plastics material in which they are to be embedded, said coating means being disposed between said reinforcing-fiber supply means and said advance axis;

means for inserting said reinforcing fiber strands into the grooves in said outer grooved rod once they have been coated with said plastics material;

a calibration die, disposed downstream from the section of the apparatus where said coated fiber strands are inserted into said grooves in said outer grooved rod, for imparting the desired cross-section to the resulting reinforcing tube;

polymerization means for polymerizing said plastics material of the reinforcing members; and means for winding the finished cable.

5. A reinforced cable containing optical fibers, the cable including an optical core assembly containing at least one optical fiber installed in a strength member, said optical core assembly being surrounded by a plurality of mechanical reinforcing members made of a plastics material reinforced with reinforcing fibers, referred to as an "FRP" material, the reinforcing members being disposed helically around said core assembly so as to form a reinforcing tube therearound, said reinforcing members having a thermal expansion coefficient that is lower than those of the remaining portions of said cable and a Young's modulus that is higher than those of the remaining portions of said cable other than said optical fibers, wherein each of said reinforcing members is separated from the adjacent reinforcing members by means of a separator made of a plastics material that has low adhesion to said FRP material, said separators being disposed such that two adjacent reinforcing members are not in contact with each other and they are separated from each other by at least a portion of one of said separators.

6. A cable according to claim 5, wherein said separators are made of a material chosen from fluorine-containing resins and polyester resins.

7. A cable according to claim 5, wherein said separators are made of a material which retains its low-adhesion properties when it is subjected to high temperatures.

8. A cable according to claim 5, wherein said separators surround each of said reinforcing members entirely or partially.

9. A cable according to claim 5, wherein said reinforcing members are disposed directly on said optical core assembly.

10. A cable according to claim 5, wherein said reinforcing members are disposed on a jacket surrounding said optical core assembly.

11. A cable according to claim 5, wherein said reinforcing members are disposed helically at an alternating pitch around said optical core assembly.

12. A cable according to claim 5, including a protective outer jacket.

13. A cable according to claim 5, wherein said optical core assembly includes a tube inside which the optical fiber(s) is are disposed so as to be free.

14. A cable according to claim 5, wherein said optical core assembly includes a central grooved rod, the optical fiber(s) being disposed in the grooves in the rod.

15. A cable according to claim 5, wherein said reinforcing fibers are chosen from fibers made of aramid, of polyester, of glass, and of carbon.

16. A cable according to claim 5, wherein said plastics material in which the reinforcing fibers are embedded is chosen from an epoxy resin, and a polyester resin.

17. A cable according to claim 5, wherein said separators are constituted by thin tapes of width at least equal to the thickness of said reinforcing tube.

18. A cable according to claim 5, wherein said separators are disposed radially relative to the axis of said cable.

19. A cable according to claim 5, wherein each of said separators has a double-bevel shaped cross-section forming a point, so that said reinforcing members interfit.

20. A cable according to claim 5, wherein said separators are constituted by the ribs in an "outer" grooved rod surrounding said optical core assembly, said reinforcing members being inserted in the grooves in the rod.

* * * * *